United States Patent [19]
Trafton

[11] 3,831,143
[45] Aug. 20, 1974

[54] CONCATENATED BURST-TRAPPING CODES

[75] Inventor: Paul J. Trafton, Washington, D.C.

[73] Assignee: Computer Science Corporation, Los Angeles, Calif.

[22] Filed: Nov. 26, 1971

[21] Appl. No.: 202,463

[52] U.S. Cl. .............. 340/146.1 AL, 340/146.1 AV
[51] Int. Cl. ............................................ H04l 1/10
[58] Field of Search .......... 340/146.1 AL, 146.1 AV

[56] References Cited

UNITED STATES PATENTS

| | | | |
|---|---|---|---|
| 3,544,963 | 12/1970 | Tong | 340/146.1 AL |
| 3,638,182 | 1/1972 | Burton et al. | 340/146.1 AL |
| 3,646,518 | 2/1972 | Weinstein | 340/146.1 AL |

*Primary Examiner*—Charles E. Atkinson
*Assistant Examiner*—B. Stephen Dildine, Jr.
*Attorney, Agent, or Firm*—Browne, Beveridge, De Grandi & Kline

[57] ABSTRACT

There is disclosed a data transmission system having a source of binary information data, encoding means responsive to the binary information data for encoding the data and applying the resulting code words to a communication link. At the receiving end of the communication link, a receiver means has a decoder for decoding the code words. The improvement lies in the encoding system which comprises means for transmitting a concatenated burst-trapping code word having the following form:

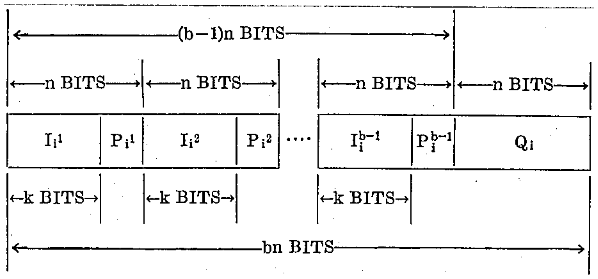

3 Claims, 6 Drawing Figures

CONCATENATED BURST-TRAPPING CODES

The present invention relates to a forward acting error-control coding system which is particularly useful for application on compound channels; i.e., channels that are characterized by both random errors and bursts of errors. The coding arrangement of this invention is a modification of the burst-trapping codes proposed by Tong, S. Y., "Burst-trapping Techniques for a Compound Channel," IEEE Trans. on Information Theory, IT-15, No. 6 (November 1969), pages 710–715; Tong, S. Y., "Performance of Burst-trapping Codes", Bell System Technical Journal Volume 49, No. 4, (April 1970), pages 477–491; Tong U.S. Pat. No. 3,544,963. These prior art burst-trapping codes have code rates equal to $(b-1)/b$ where $b$ is an interger greater than 1. These codes can correct burst spanning $l$ codewords with an error-free guard space of $(b-1)$ $l$ codewords. The codes can also be designed to perform correction of a few random errors per codeword. Published results for these codes indicate good performance on the switched telephone network. The improved codes described herein (which are called concatenated burst-trapping codes) eliminate the requirement of a completely error-free guard space following the occurrence of a burst in order to recover the codewords corrupted by the burst and are less expensive and simpler to implement. To achieve this capability requires some sacrifice in code rate. However, in the prior art, the presence of errors in the guard space not only leads to incorrect recovery from a burst but can also lead to erroneous decoding of future codewords.

The theory of concatenated burst-trapping codes will be discussed more fully hereinafter and their important properties, including random and burst-error-correcting capabilities, guard space requirements, storage requirements, and error propagation characteristics will be presented. Finally, the results of using codes according to their inventions as a means of forward error control for channels consisting of microwave and /or wideband cables operating at 40.8 kb/s will be demonstrated.

The object of this invention is to provide improved communication methods and apparatuses using an improved burst-trapping code.

The above and other objects and advantages of the invention will become apparent from the following specification when considered with the accompanying drawings wherein.

Figure 3:
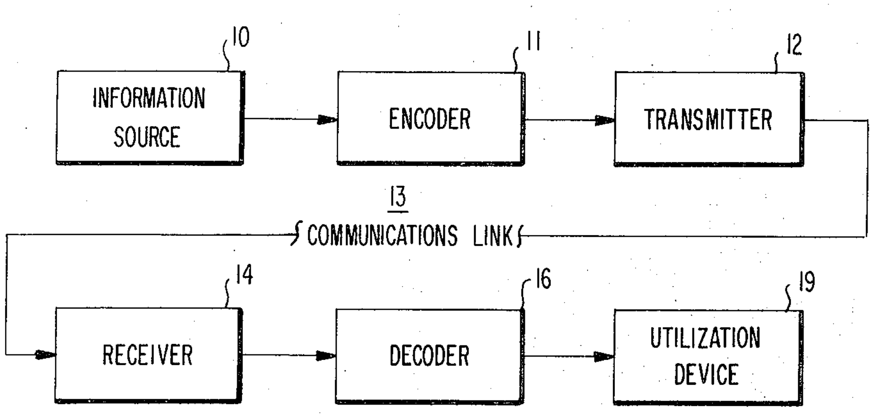
FIG. 3 is a schematic block diagram of a communication or data transmission system incorporating invention.

Referring initially to FIG. 3, a data transmission system is disclosed having a source of binary information 10 supplying an encoder 11, constructed in accordance with this invention, with the output thereof being applied to a transmitter 12. It will be appreciated that the elements shown separately as information source 10, encoder 11 and transmitter 12 may constitute a single unit or, transmitter 12 may be multiplexed with the units in a well known manner. The output of the transmitter is applied to a communication link 13, typically a telephone communication link but may be a radio or other form of the communication link. At the output end of the communication link 13 is a receiver 14 which receives the signal and processes same in a conventional manner. Such signals are applied to a decoder 16, shown in greater detail in FIG. 5 which decodes the concatenated code words and applies the output thereof to utilization device 19 which may be a printer, other transmitter or like device.

Figure 1:
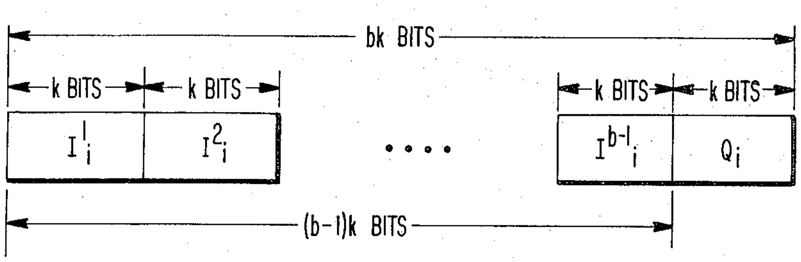
FIG. 1 (PRIOR ART)
FIG. 1 is a prior art burst-trapping code word.

Referring now to FIG. 1 a codeword from a burst-trapping code consists of $b$ blocks each having length $k$ bits with $(b-1)$ blocks consisting of information bits. Therefore, the code rate is $(b-1)/b$. The final block of $k$ bits, $Q_i$, is composed as follows:

$$Q_i = P_i \oplus I_{i-l}{}^1 \oplus I_{i-2}{}^2{}_l \oplus \ldots \oplus I_{i-(b-1)l}{}^{b-1}$$

where $P_i$ represents the block of parity bits obtained by block encoding the $(b-1)$ information blocks (i.e., $I_i{}^1, \ldots, I_i{}^{b-1}$). $I_{i-l}{}^1$ is an information block that was originally transmitted in the $(i-l)$-th codeword and similarly for $I_{i-2}{}^2$l,..., $I_{i-}$(b–1)l. The parameter $l$ is called the block interleaving factor. It is this feature of transmitting each information block twice over the channel that provides the burst-correcting capability of the code. If an information block is corrupted by a burst of errors on its first transmission over the channel, then it may be recovered $l$ or $2l$ or, ..., or $(b-1)l$ codewords later if a sufficiently long error free guard space follows the burst.

Having given the structure of a prior art burst-trapping codeword, the decoding procedure will now be described. The decoder operates in two modes, a random error correcting mode and a burst recovery mode. In the random error correcting mode, the decoder decodes the $i$-th codeword as follows. The decoder has in storage $I_{i-l}{}^1, I_{i-2l}{}^2, \ldots, I_{i-(b-1)l}{}^{b-1}$, which are assumed to have been reliably recovered from codewords $i-1l, i-2l, \ldots, i-(b-1)$l. These information blocks are added bit-by-bit modulo-2 to $Q_i$ and this recovers $P_i$. The $i$-th codeword can now be decoded using a random error correcting algorithm which corrects up to $t$ errors and detects up to $(t+s)$ errors where $2t+s<d$ and $d$ is the minimum Hamming distance of the code. As long as no more than $t$ errors occur in a codeword, the decoder continues to operate in this manner.

If the decoder detects more than $t$ errors in a codeword, then all $(b-1)$ of the information blocks are labeled unreliable and these blocks must be recovered from the codewords received $l, 2l, \ldots, (b-1)l$ codewords later. The essential point in the burst recovery mode is the observation that $Q_i$ is a linear sum of $b$ components and if $(b-1)$ of these are known, then the remaining component can be found. An estimate of $P_i$, $\hat{P}_i$, is obtained simply by re-encoding $I_i{}^{b-1}, \ldots, I_i{}^1$. It must be assumed that these information blocks have been received error-free and this is a weakness of the code since even a single error in $I_i{}^{b-1}, \ldots, I_i{}^1$ will result in an erroneous $\hat{P}_i$. If all but one of $I_{i-l}{}^1, I_{i-2l}{}^2, \ldots, I_{i-(b-1)l}{}^{b-1}$ are labeled reliable in storage, then a new estimate of the unreliable block can be found by adding $\hat{P}_i$ plus the $(b-2)$ reliable blocks to $Q_i$.

The burst-correcting capability of this code can now be easily determined. Suppose a burst of errors spans no more than $l$ codewords, e.g., information blocks $I_i^{b-1}$, ...., $I_i^1$, ..., $I_{i+1}^{b-1}$,...., $I_{i+1}^1$,..., $I_{i+l-1}^{b-1}$,..., $I_{i+l-1}^1$ are detected to contain more errors than can be corrected by the decoder in the random error correcting mode. Then if codeword $(i+l)$ is received error-free, $I_i^1$ can be recovered from $Q_{i+l} = P_{i+l} \oplus I_i^1 \oplus I_{i-l}^2 \oplus ... \oplus I_{i-(b-2)l}$ since $P_{i+l}$ can be obtained by encoding $I_{i+l}^{b-1}$ ,..., $I_{i+l}^1$ and all the remaining components of $Q_{i+l}$ except $I_i^1$ were not affected by the burst and are in storage. Similarly, $Q_{i+l+1}$ yields a new estimate of $I_{i+l}$ and finally $Q_{i+(b-1)}$ yields a new estimate of $I_{i+l-1}^{b-1}$ which is the last information block that was affected by the burst. The above can be summarized as follows. A burst spanning $l$ codewords can be recovered if an error free guard space of $(b-1)l$ codewords follows the burst. The ratio of guard space $G$ to burst length $B$ is therefore given by $$G/B = (b-1)l/l = b-1$$

From the Gallager bound, it is known that for any burst correcting code, the ratio of guard space to burst length cannot be less than the following:

$$G/B = 1 + R/1 - R$$

where $R$ is the code rate. For the burst-trapping codes discussed above, $R$ is given by $(b-1)/b$. Therefore, $$G/B = \frac{1+\frac{b-1}{b}}{1-\frac{b-1}{b}} = 2b-1 > b-1$$

The burst-trapping codes violate the Gallager bound. However, the Gallager bound applies to burst-correcting codes that are guaranteed to correct every burst of length $B$ and there is a small probability that a burst, or a portion of a burst, will not be detected by the burst-trapping decoder and therefore will not be corrected. The probability of nondetection of a burst can be made very small, however, if the amount of error correction performed in the random error correcting mode is kept small and most of the code redundancy is used for error detection.

Storage requirements for a burst-trapping encoderdecoder can be readily determined. The encoder requires $b(b-1)/2\ lk$ bits of storage for delayed information blocks plus a k bit shift register for encoding plus a small amount of logical circuitry. The decoder also requires $b(b-1)/2\ lk$ bits of storage for information blocks plus storage for a t error correcting decoder. The amount of storage required for information blocks is directly proportional to $l$, the burst correcting capability, but increases as the square of $b$, the number of blocks into which the information bits of a codeword are segmented. Increasing $b$ increases the code rate but also increases the guard space requirement as well as the storage requirements.

For many error-correcting codes there exists the possibility of error-propagation, i.e., the decoder continues to make decoding errors even though channel errors have ceased. Error propagation has been shown to be a potential problem with convolutional codes. Error propagation is also a problem with burst-trapping codes but it can be shown that the propagation is finite.

To examine the error propagation characteristics of burst trapping codes, consider every $l$-th codeword as follows:

$$C_i + [P_i \oplus I_{i-l}^1 \oplus I_{i-2l}^2 \oplus I_{i-3l}^3 \oplus \ldots \oplus I_{i-(b-1)l}^{b-1}]$$

$$C_{i+l} + [P_{i+l} \oplus I_i^1 \oplus I_{i-l}^2 \oplus I_{i-2l}^3 \oplus \ldots \oplus I_{i-(b-2)l}^{b-1}]$$

$$C_{i+2l} + [P_{i+2l} \oplus I_{i+l}^1 \oplus I_i^2 \oplus I_{i-l}^3 \oplus \ldots \oplus I_{i-(b-3)l}^{b-1}]$$

$$C_{i+3l} + [P_{i+3l} \oplus I_{i+2l}^1 \oplus I_{i+l}^2 \oplus I_i^3 \oplus \ldots \oplus I_{i-(b-4)l}^{b-1}]$$

$$C_{i+4l} + [P_{i+4l} \oplus I_{i+3l}^1 \oplus I_{i+2l}^2 \oplus I_{i+l}^3 \oplus \ldots \oplus I_{i-(b-5)l}^{b-1}]$$

In the above, $C_i$ designates all the information blocks of the $i$-th codeword and likewise for $C_{i+l}$, $C_{i+2l}$,... The arrows indicate the manner in which the information blocks of $C_i$, $C_{i+l}$,... are delayed and added to later codewords. The code is assumed to be $t$ error correcting when in the random error correcting mode where $t \leq [d-1/2]$ and $d$ is the minimum Hamming distance of the code. The brackets denote "integer part of."

It will now be assumed that there are no channel errors from codeword $(i+l)$ onward. The problem is to determine to what extent the decoder may continue to make decoding errors beyond this point. Since codeword $(i+l)$ is received without channel errors, incorrect decoding can only occur by addition to $Q_{i+l}$ of the blocks $I_i^1$,..., $I_{i-(b-2)l}^{b-1}$ which have been assumed reliable by the decoder but which actually contain errors as a result of previous erroneous decoding. The decoder can introduce at most $t$ errors in $C_{i+l}$. This may occur if codeword $(i+l)$ now contains enough errors in $P_i$ so that it is within Hamming distance $t$ of another valid codeword. This may also occur for codewords $(i+2l)$, $(i+3l)$,..., $i+(b-1)l$; i.e., all those codewords may be erroneously decoded with a maximum of $t$ errors introduced into $C_{i+l}$, $C_{i+2l}$..., $C_{i+(b-1)l}$. This implies that a maximum of $(b-1)t$ errors may be introduced into codeword $(i+bl)$ when it is decoded without the introduction of any channel errors from codeword $(i+l)$onward. Now, at least $(d-t)$ errors must be present in $P_{i+bl}$ to allow the possibility of incorrect decoding of codeword $(i+bl)$. Under the most pessimistic assumption, $t$ errors may be introduced into $P_{i+bl}$ from addition of $I_{i+l}^{b-1}$ (i.e., from $C_{i+l}$). This implies that $(d-2t)$ errors must be introduced into codeword $(i+bl)$ from $C_{i+2l}$,...,$C_{i+(b-1)l}$. Thus, a new propagation of $t$ errors from incorrect decoding of codeword $(i+bl)$ plus $(b-2)t-(d-2t)$ errors from $C_{i+l}$,...,$C_{i+(b-1)l}$ are available to maintain error propagation. This gives a total of $(b-1)t-(d-2t)$ errors which represents a net loss since $d > 2t$. In general, a net loss of at least $(d-2t)$ errors must also occur from decoding codeword $i+(b+1)l$ and all succeeding codewords. The propagation can theoretically continue until there are not enough errors remaining to equal $(d-t)$. At this point, error detection or correction must occur and propagation ceases. This leads to a maximum of $$(b-1)t-(d-t)/d-2t+1 = (b-2)t/d-2t \qquad (1)$$

incorrectly decoded codewords after the first $(b-1)$ codewords following cessation of channel errors. Since only every $l$-th codeword has been considered in the above, equation (1) must be multiplied by $l$ to obtain the total number of codewords that may be affected by error propagation. Actually, the above argument is based on extremely pessimistic assumptions and in reality error propagation is almost certain to be very limited. The point is that error propagation following the cessation of channel errors is necessarily finite.

An interesting additional problem is the effect of errors occurring in codewords $(i+bl)$, $i+(b+1)l$, ..., i.e., channel errors do not entirely cease. If there are $t'$ random errors in the information blocks of $C_{i+bl}$, then $(b-1)t+2t'-(d-2t)$ errors may be available for further error propagation. If $t'$ random errors continue to occur in the information blocks of succeeding codewords and if $t' \geq (d-2t)/2$, then the possibility of indefinite error propagation arises. This provides motivation for obtaining protection against random errors which occur following a burst of errors.

THE PRESENT INVENTION AND CONCATENATED BURST-TRAPPING CODES

When a conventional burst-trapping decoder is in the burst recovery mode, it must be assumed that $I_i^{b-1}$,..., $I_i^{\ 1}$ are error free. These information blocks are then encoded to yield $\hat{P}_i$ which in turn is used to obtain a new estimate of an information block previously corrupted by a burst. If $I_i^{b-1}$,...,$I_i^1$ contain even a single error, then $P_i$ will contain at least $(d-1)$ errors and these $(d-1)$ errors will be introduced into the information block being recovered. It therefore appears desirable to provide protection against random errors occurring in the guard space following a burst. This can be done at some sacrifice in code rate. The structure of such a code is shown in FIG. 2 which discloses the basic feature of the present invention.

Figure 2:
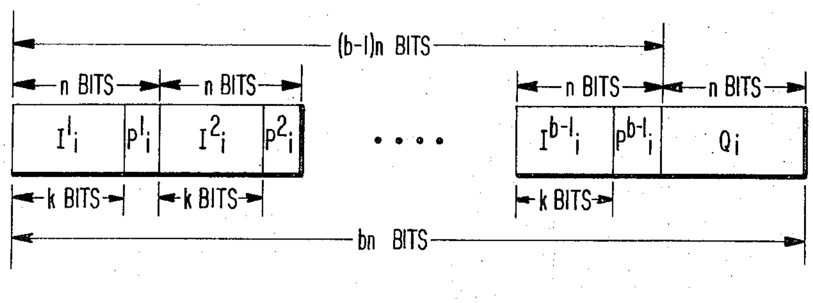
FIG. 2 shows a form of a code word transmitted in accordance with the present invention.

Concatenated Burst-trapping Codewords (FIG. 2)

Thus, the difference between the codeword in FIG. 2 and the one shown in FIG. 1 is the introduction of inner codewords obtained by encoding each block of $k$ information bits. The final block of $n$ bits, $Q_i$ is given by $$Q_i = P_i \oplus I_{i-l}{}^{1'} \oplus \ I_{i-2l}{}^{2'} \oplus \ ...I_{i-(b-1)l}{}^{b-1'}$$

where $I_{i-l}{}^{1'}$ is the inner codeword made up of $1_i^1$ and $P_{i1}$, and similarly for $I_{i-2l}{}^{2'}$, etc. The code rate for this code is given by r (b − 1)/$b$ where $r$ equals $k/n$, the code rate of the inner code. An encoder for a concatenated burst-trapping code is shown in FIG. 4.

Figure 5:
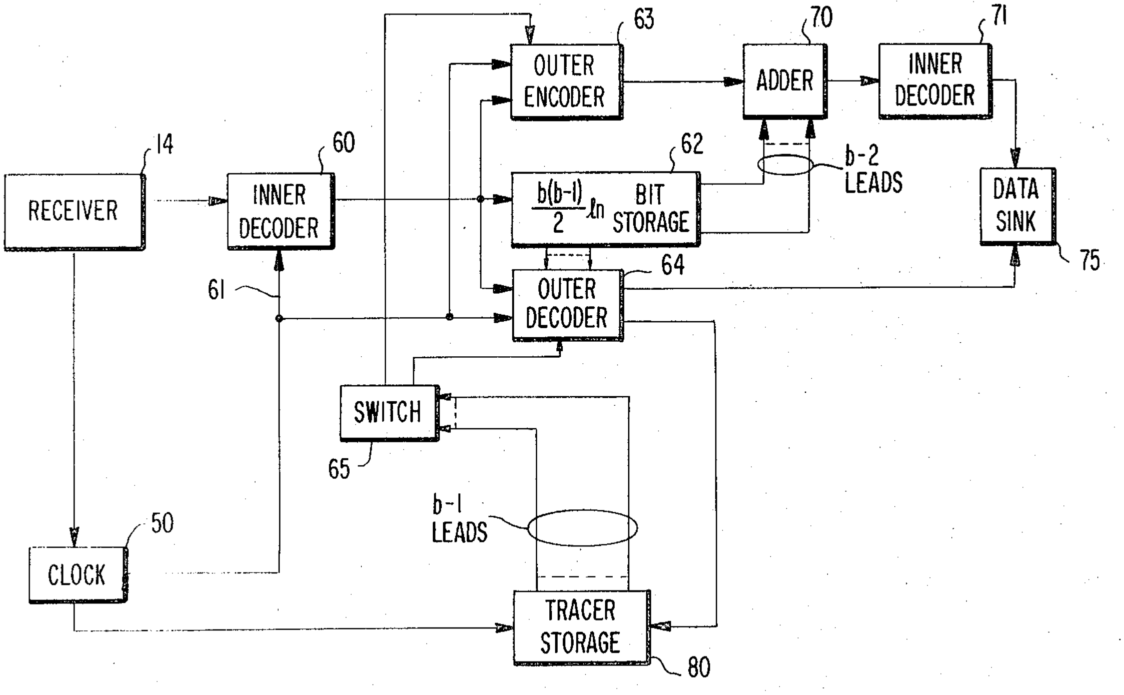
FIG. 5 is a block diagram of a decoder at a receiving station in accordance with the invention and FIG. 6 is a decoding chart for a specific concatenated burst-trapping code disclosed herein.

The decoder for a concatenated burst-trapping code shown in FIG. 5 operates in two modes, a random error correcting mode and a burst recovery mode. In either mode, however, there is now an initial operation which is simply the decoding of the inner codewords. This occurs in either mode which implies that some random errors can be corrected in the guard space following a burst. Except for this initial decoding of the inner codewords, the decoding procedure is similar to that for the ordinary burst-trapping code.

Figure 4:
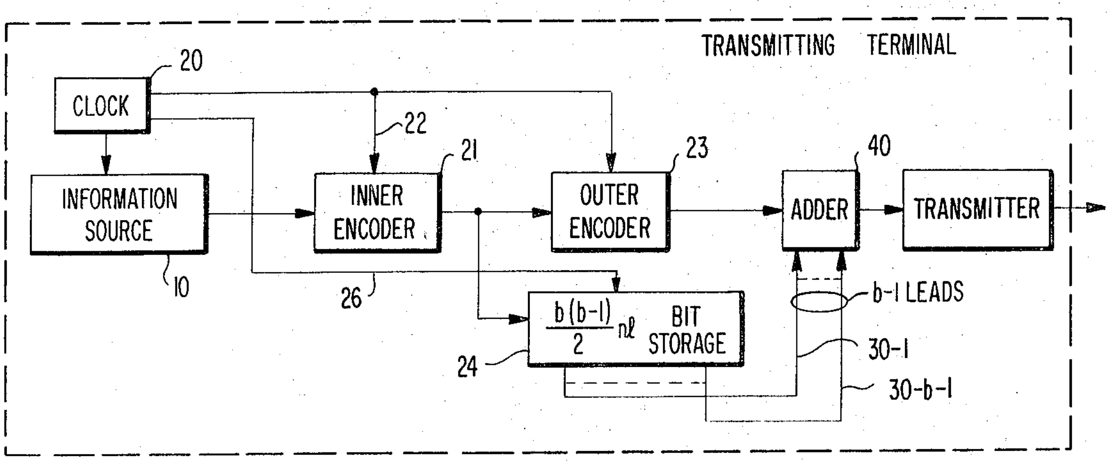
FIG. 4 is a block diagram of a transmitting terminal showing in block diagram form the encoder in accordance with the present invention.

As shown in FIG. 4, the transmitting terminal is illustrated as having information source 10 as a part thereof. Information source 10 may be a storage device or a register with an input from clock 20 for stepping data therefrom. The output from information source 10 is applied to inner encoder 21 along with a sequence of clock pulses on line 22. These same clock pulses are applied to an outer encoder 23 which receives as information input the output of inner encoder 21. These inner and outer encoders are well known and substantially like the encoders shown in FIG. 3 of Tong U.S. Pat. No. 3,544,963. The inner encoder 21 also applies this output to a bit storage unit 24 which also receives clock pulses on line 26 from clock 20. As indicated each of the encoders 21 and 23 may be of the type shown in Tong. The bit storage means 24 has a plurality of outputs $(b-1)$ in number with each of the outputs being applied to a lead 30–1...30–$b$–1 and these outputs are applied to an adder circuit 40 along with the output of outer coder 23. Thus, the codeword is shown in FIG. 2, having the inner codewords obtained by encoding each block of $l$ information bits in a manner described above. As indicated earlier, the inner encoder and outer encoders are similar to the single encoder shown in the Tong patent except for the storage length and tap configuration etc. These codewords (information bits onto channel first followed by the parity bits) are applied to the transmitter unit 12 for application to the communication link 13.

The random error correcting capability of the concatenated burst-trapping code is derived primarily from the inner decoders 60 and 71. The inner decoder 60 can correct $t$ errors in $n$ bits where $t \leq [d-1/2]$ and $d$ is the minimum distance of the inner code. The outer decoder is allowed to correct $t$ errors in the parity positions, $P_i$, of the outer codeword plus error detection for the entire outer codeword. The inner and outer decoders are well known per se and may take the form shown in the above mentioned Tong patent. If one or more of the inner codewords has been decoded incorrectly, then the codeword presented to the outer decoder will contain more than $t$ errors. Thus, a $t$ error correcting outer decoder is not capable of correcting any errors in the first $(b-1)$ blocks of the outer codeword. An attempt by the outer decoder to do so must be considered to be error detection.

The burst correcting capability of this code can be stated as follows. A burst spanning $l$ codewords can be corrected if a guard space of $(b-1)l$ codewords follows the burst in which there is no more than $t$ errors in each block of $n$ bits. The random error correcting capability of the code is always $t$ errors in a block of $n$ bits, including the guard space following a burst.

The storage requirements for the concatenated burst-trapping encoder-decoder of this invention are very similar to those of the ordinary burst-trapping encoder-decoder. The encoder requires $l\ nb\ (b-1)/2$ bits of storage for stored inner codewords plus an $(n-k)$ stage shift register for the inner encoder plus an $n$ stage shift register for the outer encoder plus a small amount of logic circuitry. The decoder also requires $l\ nb\ (b-1)/2$ bits of storage for inner codewords plus a moderate amount of storage for the inner and outer decoders plus logic circuitry.

The decoder includes a receiver 14. As is conventional, the clock 50 may be a local clock or may be a clock derived from the received signals. That is, the data source and transmitter are synchronous stepped in clock relation. (A asynchronous operation of the receiver and transmitter may in some cases be used.) Signals from receiver 14 are applied to an inner decoder 60 along with first clock pulses on line 61. The output from inner decoder 60 is applied first to a bit storage 62 and also to outer decoder and outer encoder units 63 and 64 respectively. The outer decoder and encoder 63 and 64 are shown, one of which is switched into operation by an output from a switch 65. This switch 65 is used to activate either the burst-trapping mode of operation or the random error correcting mode of operation, one of 63 and 64 being used in either case. In addition, it will be noted that the output of inner decoder 60 is applied to the bit storage 62 and that the output of these bit storage 62 includes a plurality of leads $b-2$ which are supplied to adder unit 70, which, in turn, supplies its output to inner decoder 71. Finally the output from decoders 64 and 71 are supplied to a data sink 75.

The unit labeled "tracer storage" 80 is a common feature of any burst-trapping code (see element 228 of Tong U.S. Pat. No. 3,544,964) and is used to determine whether the decoder is to operate in random error correcting mode or in burst recovery mode and controls the operation of switch 65.

Figure 6:
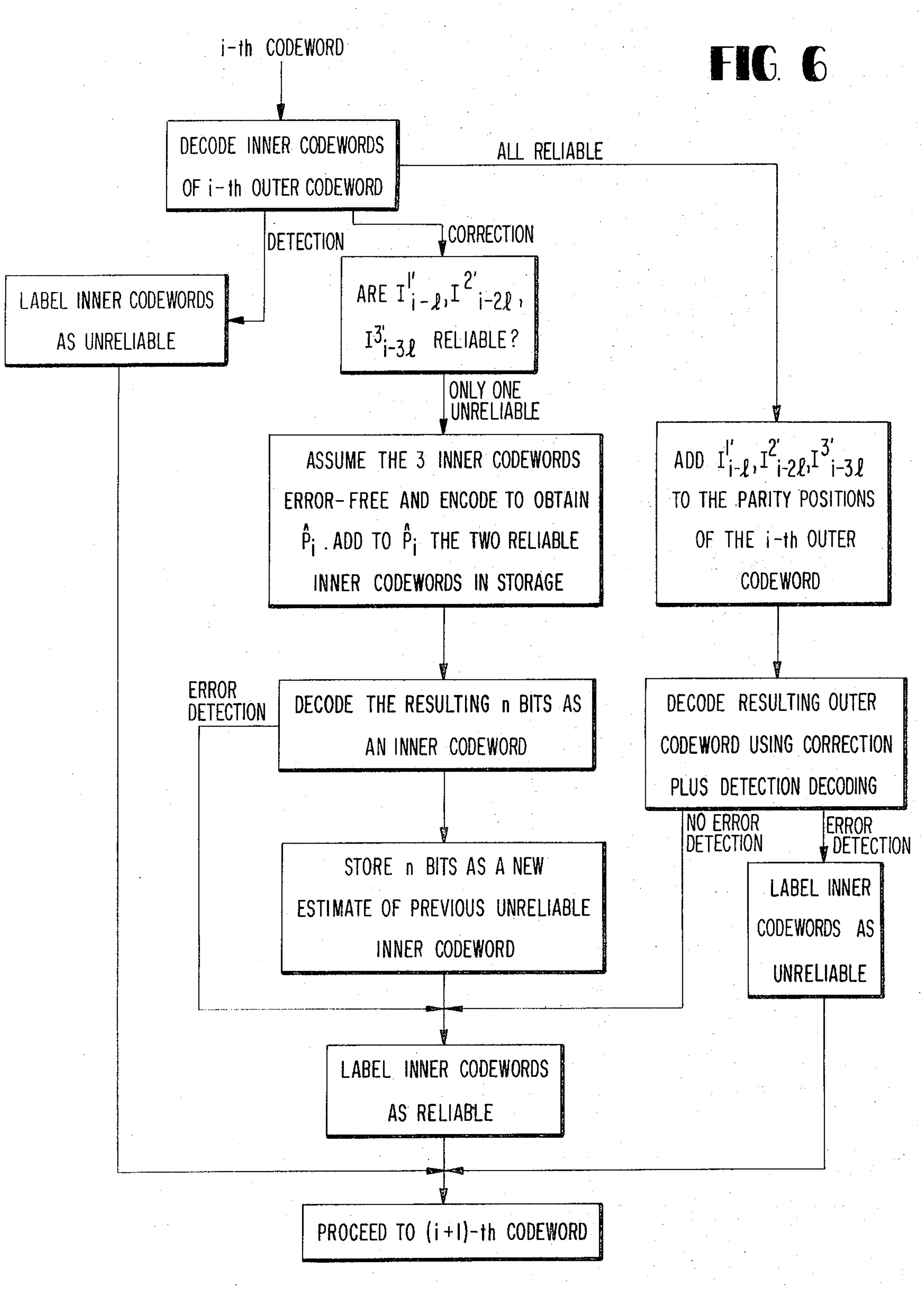

The decoding flow chart for a specific concatenated burst-trapping code according to this invention is shown in FIG. 6. It will be appreciated that this computer program format for showing the manner of decoding a concatenated burst-trapping codeword is for purposes of illustration and other forms of illustrating the decoding scheme may be used without departing from the invention. This detailed decoding flow chart is used particularly with respect to decoding the example codes given below.

A brief summary outline of the procedure used to decode the above burst-trapping codes will now be given. The $i^{th}$ outer codeword is assumed to have been received.

1. The inner codewords are decoded using single or double error correcting decoders.
2. If all of $I_{i-l}^{1'}$, $I_{i-2l}^{2'}$, and $I_{i-3l}^{3'}$, are in storage and labeled reliable, then these three codewords are added to the parity positions of the outer codeword giving $P_i$.
   a. The outer codeword is now decoded using single or double error correction plus detection. If correction occurs, then $I_i^{1'}$, $I_i^{2'}$ and $I_i^{3'}$ are placed in storage and labeled reliable. If detection occurs, $I_i^{1'}$, $I_i^{2'}$ and $I_i^{3'}$ are placed in storage and labeled unreliable.
3. If one of $I_{i-l}^{1'}$, $I_{i-2l}^{2'}$, and $I_{i-3l}^{3'}$ is in storage labeled unreliable, then the two reliable codewords are added to the parity position of the outer codeword. The three inner codewords, $\bar{I}_i^{1'}$, $\bar{I}_i^{2'}$, $I_i^{3'}$ are encoded to give $\hat{P}_i$, an estimate of $P_i$. $\hat{P}_i$ is also added to the parity positions of the outer codeword giving a new estimate of the unreliable inner codeword.
   a. $I_i^{1'}$, $I_i^{2'}$, $I_i^{3'}$ are placed in storage labeled reliable.
4. Proceed to the $(i+1)^{st}$ codeword.

The possibility of error propagation must also be examined for the concatenated coding scheme. The error propogation discussed above is still applicable with the understanding that $C_i$, $C_{i+l}$,... consists of inner codewords instead of only information bits. As before, it is assumed that there are no channel errors from codeword $(i+l)$ onward. Since codeword $(i+l)$ is received error-free, errors can only be introduced by the addition of $I_i^{1'}$, $I_{i-l}^{2'}$, ..., $I_{i-(b-1)l}^{b-1'}$ to $Q_{i+l}$ which contain errors as a result of previous erroneous decoding. However, these errors can produce no errors in $C_{i+l}$ since the outer decoder is not allowed to correct errors in $C_{i+l}$ (it is not capable of doing so as discussed previously). Therefore, error propagation is non-existent with the concatenated burst-trapping code. As soon as channel errors stop, no further information blocks will be erroneously decoded as a result of previous decoding failures. This is due entirely to the fact that the outer decoder is not allowed to do error correction in the inner codewords.

However, one potential difficulty with the concatenated burst-trapping code is apparent. Failure of the inner decoder will generally result in the introduction of additional errors in an inner codeword. This will increase the probability that the outer decoder will fail to detect the presence of errors in the inner codewords; i.e., the probability of an undetected burst will be increased. This potential difficulty can best be investigated experimentally, i.e., determine the code performance with the use of emperical or simulated data. Also, the inner decoder will generally have some capability of detecting error patterns of weight greater than $t$.

In summary, at a sacrifice in code rate, the concatenated burst-trapping codes have two advantages over the original burst-trapping codes. There is no error propagation following the cessation of channel errors and the code has the capability of correcting some errors in the guard space following a burst, i.e., when the decoder is in the burst recovery mode.

SPECIFIC CONCATENATED BURST-TRAPPING CODES

The parameters of two concatenated burst-trapping codes whose performance has been evaluated using actual channel error data are given below.

CODE 1

$b=4$

Inner code: a (28,23) code obtained by shortening a (31,26) BCH code: $n=28$, $k=23$, $t=1$ Outer code: a (112,84) code obtained by shortening a (127,99) BCH code: $d=9$, $t=1$, $s=6$

R=(3/4)23/28=0.62

G/B=3

Random error correcting capability: 1 error in 28 bits

Burst correcting capability: bursts spanning $l$ codewords (112 $l$ bits) with no more than 1 error in 28 bits in guard space (336 $l$ bits)

A detailed decoding flow chart for the above concatenated burst-trapping code is shown in FIG. 6.

It is to be understood that the above-described embodiment of the invention is only illustrative thereof and that many modifications and other changes may be made by those skilled in the art without departing from the scope of the invention.

What is claimed is:

1. In a data transmission system having a source of binary information data, encoding means responsive to said binary information data for encoding same and applying resulting code words to a communication link, and means receiving and decoding said code words, improvement in said encoding means comprising means for transmitting a concatenated codeword in the following form:

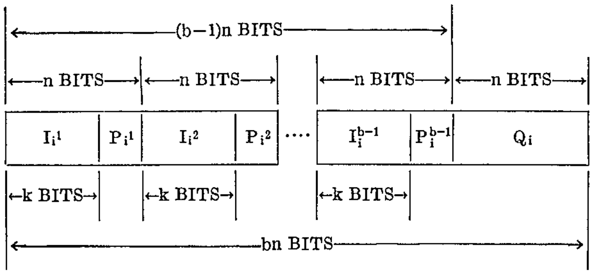

wherein $I_i^1$, $I_i^2$, and $I_i^{b-1}$ are block parity bits, the superscript indicating their respective positions, $P_i^1$, $P_i{}^2$, and $P_i^{b-1}$ are block parity bits, the superscript indicating their respective positions, $Q_i$ is a linear sum of the $b$ components, $b$ is the sum of information blocks and the final $Q_1$ block, $n$ is the sum of bits in an information block and adjacent parity block, and $k$ is the number of bits in each information block $I_i$.

2. A data transmission system as defined in claim 1 including decoding means for decoding concatenated codewords of the form shown in claim 1.

3. In a data transmission system having an encoding means responsive to binary information electrical signals from a source of such signals applying the encoded information signals to a communication link, and means receiving and decoding the information signal, a method of improving transmission of information comprising the steps of 1. encoding said binary information electrical signals to produce binary code words having the following form:

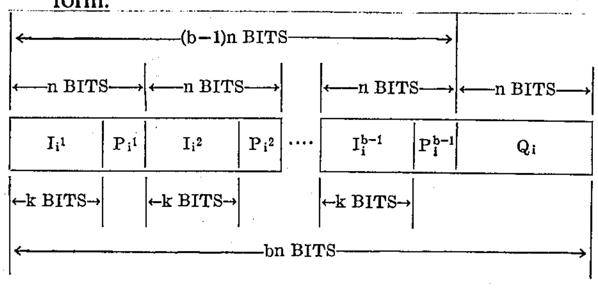

wherein $I_i^1$, $I_i^2$, and $I_i^{b-1}$ are blocks of information bits, the superscript indicating their respective positions, $P_i^1$, $P_i^2$, and $P_i^{b-1}$ are block parity bits, the superscript indicating their respective positions, $Q_i$ is a linear sum of the $b$ components, $b$ is the sum of information blocks and the final $Q_1$ block, $n$ is the sum of bits in an information block and adjacent parity block, and $k$ is the number of bits in each information block $I_i$.

and 2. applying the binary code words having the above form to said communication link.

* * * * *